Nov. 11, 1941.   H. I. MORRIS   2,262,619
APPARATUS FOR CUTTING METAL INTO SECTIONS
Original Filed March 11, 1937    3 Sheets-Sheet 1
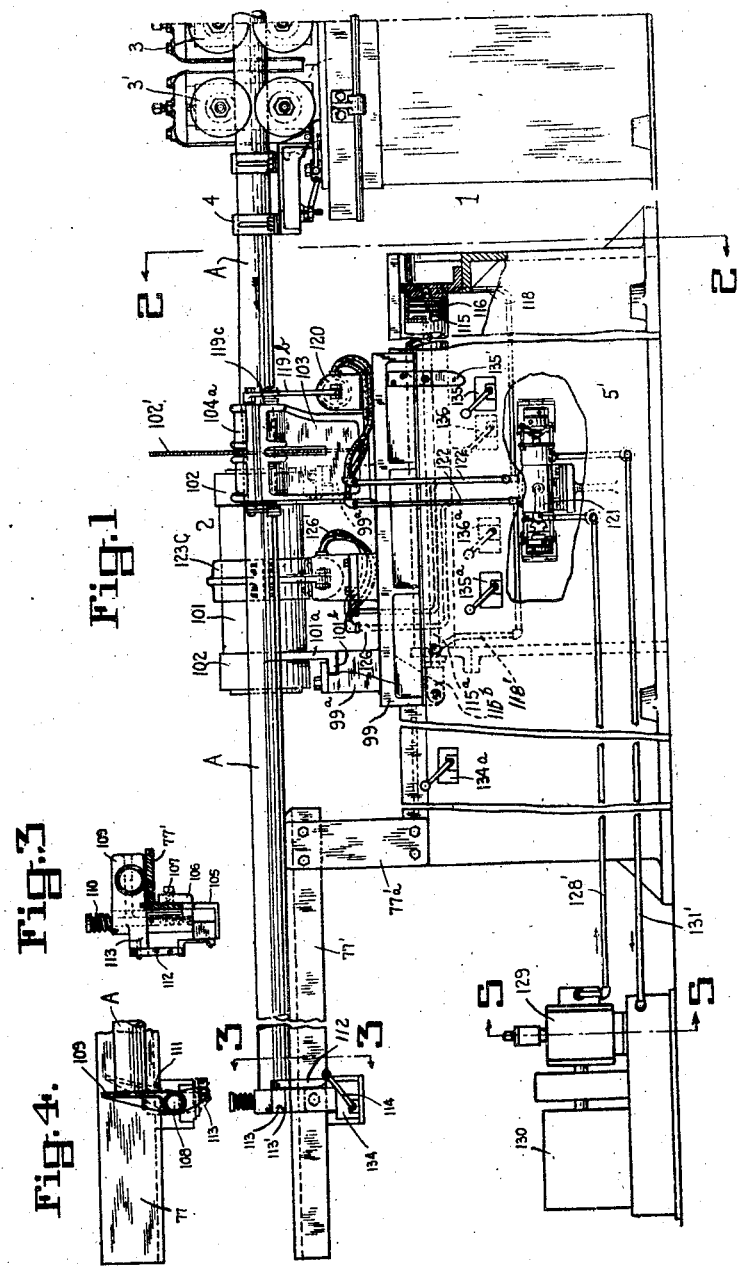

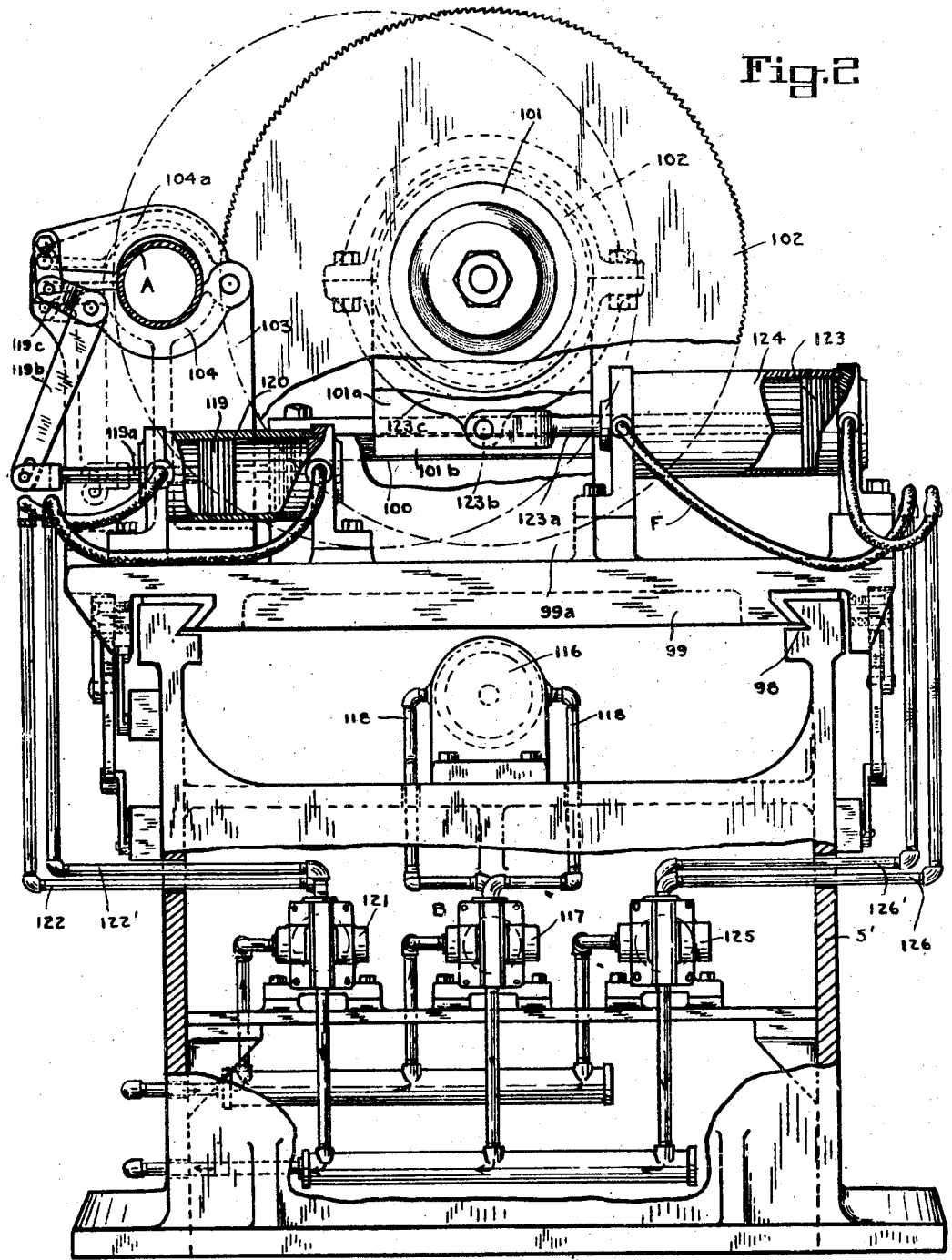

Nov. 11, 1941.   H. I. MORRIS   2,262,619
APPARATUS FOR CUTTING METAL INTO SECTIONS
Original Filed March 11, 1937   3 Sheets—Sheet 3

Inventor
Howard I. Morris
By
Geo. B. Pitts
Attorney

Patented Nov. 11, 1941

2,262,619

UNITED STATES PATENT OFFICE 2,262,619

APPARATUS FOR CUTTING METAL INTO SECTIONS

Howard I. Morris, Lakewood, Ohio, assignor to The Yoder Company, Cleveland, Ohio, a corporation of Ohio Original application March 11, 1937, Serial No. 130,322. Divided and this application May 8, 1939, Serial No. 272,354

16 Claims. (Cl. 29—69)

This invention relates to a machine for automatically cutting material into predetermined lengths, more particularly a machine adapted to be related to a continuously operating material forming machine and operated conjointly therewith so that the formed material is continuously supplied and while in movement may be cut into lengths and discharged to avoid re-handling and permit ready stacking. For purposes of illustration, the formed material is shown as consisting of a pipe which may be of any desired diameter, but in the use of the term pipe it is for purposes of description and not as a limitation of the invention.

This application is a division of my application filed March 11, 1937, Serial No. 130,322.

One object of the invention is to provide an improved machine of this type wherein the cut-off mechanism is arranged to move with the material and automatically connect itself to the formed material and automatically disconnect itself therefrom.

Another object of the invention is to provide an improved machine of this type wherein the cutter or tool is mounted on a slide and both the tool and slide are operated hydraulically and controlled to effect movement of the slide and the work while cutting thereof takes place.

Other objects of the invention will be apparent to those skilled in the art to which my invention relates from the following description taken in connection with the accompanying drawings, wherein Fig. 1 is a side elevation showing a machine embodying my invention.

Fig. 2 is a section on the line 2—2 of Fig. 1, enlarged, parts being broken away.

Fig. 3 is a section on the line 3—3 of Fig. 1.

Fig. 4 is a plan view of the parts shown in Fig. 3.

Figure 7:
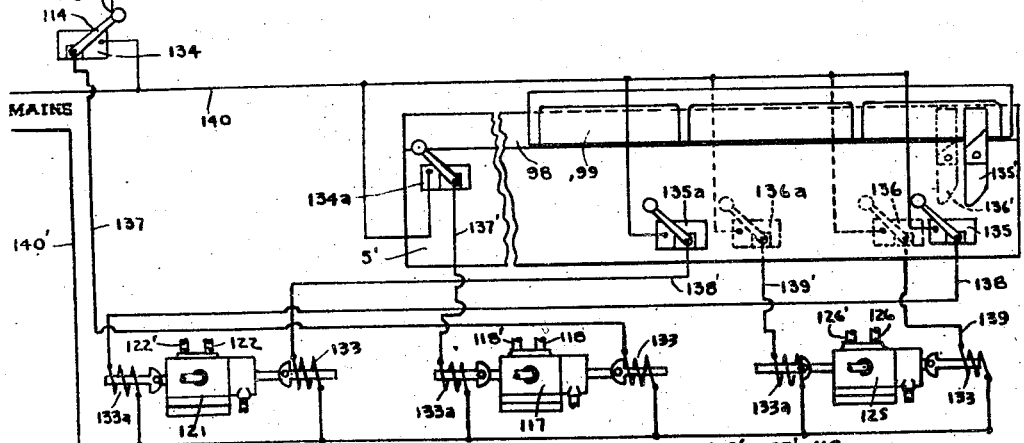
Fig. 7 is a diagrammatic view showing the electrical wiring for the machine.

In the drawings, 1 indicates a portion of a machine for continuously forming material into a predetermined cross sectional shape for delivery to a cut-off mechanism indicated as an entirety at 2. The pre-formed material herein chosen for illustration consists of pipe A which is fed forwardly by one or more pairs of feed rolls 3, 3', to and through a mechanism 4 which may be of a type to size the pipe, to reduce its diameter or to eliminate any tendency of the pipe to spring laterally; also, the pipe as delivered may be of any desired form, that is, its edges may be connected (welded or interlocked) or lapped or related edge to edge ready for welding.

Of the cut-off machine 2, 5' indicates a frame having guides 98 for a slide 99. The slide 99 is provided with transverse blocks 99a having ways 100. 101 indicates an electric motor mounted at its opposite ends in collars 102 provided with depending arms 101a having shoes 101b which engage the ways 100 to slidably support the motor 101 on the slide 99 for movement transversely thereof. 102' indicates a saw or cutter fixed to the motor shaft and arranged to sever the work A when the motor and its supporting arms are moved on the ways 100 to the position shown in dotted lines in Fig. 2. 103 indicates a standard mounted on the slide 99 and provided at its upper end with a work clamping jaw 104 and a movable jaw 104a pivoted at its inner side on the standard 103 (see Fig. 2) and arranged to clamp and release the work A in the forward movement of the slide 99. In this form of construction the movement of the slide 99 in either direction, the operation of the clamping jaw 104a and the movement of the motor 101 and cutter 102' in either direction are effected by fluid pressure, preferably hydraulic means and the valves for the latter are operated by solenoids which are controlled by electric switches, as later set forth.

77' indicates an angle supported on the frame 5' at one end by a bracket 77a'. The bracket 77' may be of any desired length depending upon the longest section of the pipe A to be severed. 105 indicates a supporting member having lugs 106 adjustably secured by bolts 107 to one side of the angle 77'. The member 105 supports a shaft 108 on which is pivoted a wing 109 normally biased by a spring 110 against a stop 111, in which position the wing 109 is disposed in the path of movement of the pipe A so that its outer or advancing end may engage with and operate the wing 109 counter-clockwise as viewed in Fig. 4.

The hub of the wing 109 is provided with a tail 113 on which is pivoted a switch operating device 112, the device being in engagement with a shoulder 113' on the tail so that the device moves with the tail 113 to operate the arm 114 of a switch (later referred to) to close an electric circuit, but is free to ride the switch arm when the tail returns to normal position.

The normal position of the wing 109 is shown in dotted lines in Fig. 4 and is arranged to operate the adjacent switch when the wing is moved to the position shown in full lines. As the free end of the pipe A, as it feeds forwardly, may be disposed at varying positions transversely of the angle 77', this arrangement insures operation of the switch at a predetermined position of the wing and the cutting of the pipe sections of a predetermined length, since it will be apparent that while the pipe may contact the wing at any point thereon, the wing does not operate the switch until it has been moved to the position shown.

The hydraulic means, valve mechanisms for the supply and discharge of the fluid and the controlling means for the valve mechanisms are similar in construction, each comprising a piston mounted in a cylinder having fluid connections at its opposite ends to operate the piston therein in either direction, a valve mechanism for supplying the fluid, such as oil, through one connection and its discharge through the other connection and a controlling means for reversing the valve to change the fluid supply and discharge. The piston 115 for operating the slide 99 is mounted in a cylinder 116 and the valve mechanism for the cylinder 116 is indicated as an entirety at 117, and is connected thereto by pipes 118, 118'. A rod 115a extends through one head of the cylinder 116 and connects the piston 115 to an arm 115b depending from the slide 99. The piston 119 for operating the jaw 104a is mounted in a cylinder 120 and the valve mechanism for the cylinder 120 is indicated as an entirety at 121 and is connected thereto by pipes 122, 122'. A rod 119a extends through one head of the cylinder 120 to connect the piston 119 to one arm of a lever 119b, pivoted on the standard 103, the other arm of the lever 119b being connected by a link 119c to the outer end of the jaw 104a to raise and lower the latter, whereby the pipe is clamped or released. The piston 123 for operating the motor 101 and cutter 102' is mounted in a cylinder 124 and the valve mechanism for the cylinder 124 is indicated as an entirety at 125 and is connected thereto by pipes 126, 126'. A rod 123a extends through one head of the cylinder 124 to connect the piston 123 to a lug 123b integral with the lower section of a split collar 123c clamped around the motor 101.

Figure 6:
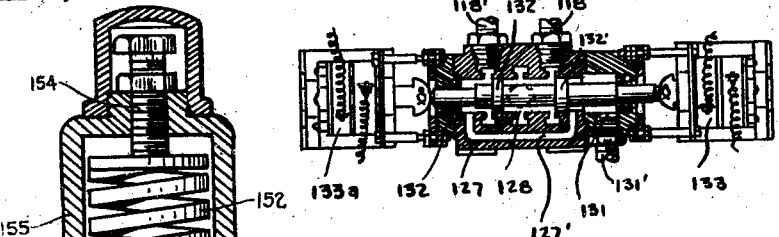
Fig. 6 is a fragmentary sectional view of one of the valves.
Figure 5:
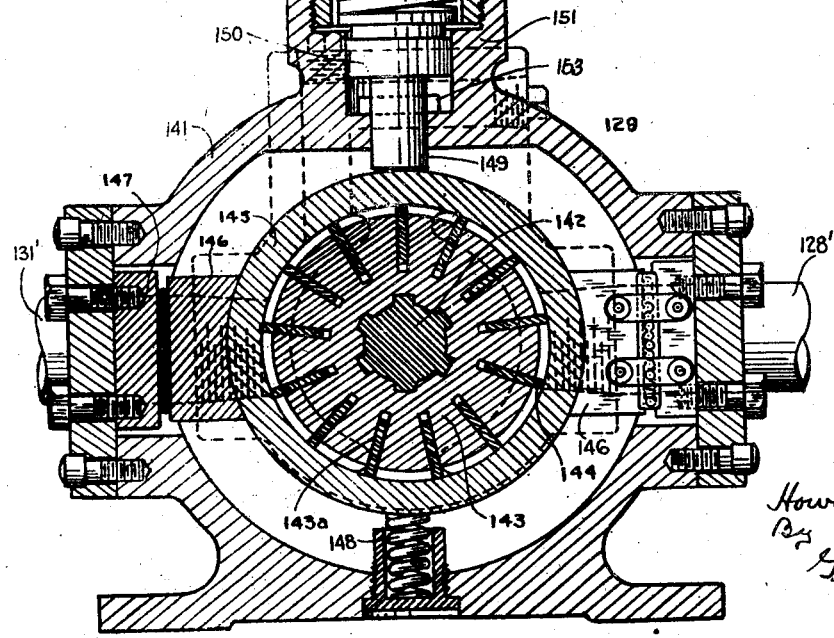
Fig. 5 is a section on the line 5—5 of Fig. 1, enlarged.

The valve mechanisms 117, 121 and 125 are similar in construction and operation, one thereof being shown in section in Fig. 6. Referring to Fig. 6, 127 indicates the valve casing having an inlet 128 and ports at opposite sides of the inlet to which the supply and discharge pipes for the adjacent cylinder are connected (for example, the pipes 118, 118', leading to the opposite ends of the cylinder 116); the inlet 128 being connected by a pipe 128' to the outlet side of a pump indicated as an entirety at 129, which is continuously driven by a suitable motor 130. 131 indicates the outlet from the valve casing 127 and connected by a pipe 131' to the inlet side of the pump 129. The valve casing is provided with a plunger 132 which extends through the opposite end walls thereof for connection with the cores of solenoids 133, 133a. The plunger 132 is provided with spaced collars 132' which in one position of the plunger connect the fluid inlet 128 to one pipe 118 to supply the fluid to one end of the adjacent cylinder and connect the other pipe 118' to the outlet 131 through a duct 127'. In the other position of the plunger 132, these connections are reversed, so the fluid is supplied through pipe 118' to the opposite end of the adjacent cylinder and discharged from the latter through the pipe 118. The plunger 132 is moved from one position to the other position by one of the solenoids 133, 133a, the coil of each of which is energized momentarily by the operation of a spring operated switch to close an electric circuit.

134, 134a, indicate the switches for closing the circuits which energize the coils of the solenoids 133, 133a, for operating the valve plunger 132 of the valve mechanism 117.

135, 135a, indicate the switches for closing the circuits which energize the coils of the solenoids 133, 133a for operating the valve plunger of the valve mechanism 121; each switch being operated by a trip 135' fixed to the slide 99, for operating the valve plunger 132 of the valve mechanism 121. 136, 136a, indicate the switches for closing the circuits which energize the coils of the solenoids 133, 133a, for operating the valve plunger of the valve mechanism 125; each switch being operated by a trip 136' fixed to the slide 99.

*Operation.*—Figs. 1 and 7 show the position of the pipe A following its engagement with the wing 109 and movement of the latter to operate the switch arm 114 and close the circuit 137 for the coil of the solenoid 133. As shown in Figs. 6 and 7, the valve plunger 132 has been moved to the right so that the fluid flows through pipe 118 to the adjacent end of the cylinder 116, and permits fluid discharge through pipe 118', the effect of which is to move the slide 99 forward toward the left, as viewed in Fig. 7. In the forward movement of the slide 99, the trip 135' engages with and operates the switch 135 which in turn closes the circuit 138 for the coil of the solenoid 133a connected to the valve plunger 132 of valve mechanism 121, which supplies fluid through pipe 122 to the cylinder 120 and permits fluid discharge through pipe 122' and effects operation of the jaw 104a to clamp the pipe A. In the continued forward movement of the slide 99, the trip 136' engages with and operates the switch 136, which in turn closes the circuit 139 for the coil of the solenoid 133 connected to the valve plunger 132 of valve mechanism 125, which supplies fluid through pipe 126 to the cylinder 124 and permits fluid discharge through pipe 126' and effects movement of the cutter 102', whereby the latter severs the pipe A (see dotted lines in Fig. 2). Next, the trip 136' engages with and operates the switch 136a, which in turn closes the circuit 139' for the coil of the solenoid 133a connected to the valve plunger 132 of valve mechanism 125, so that the fluid is supplied through pipe 126' to the cylinder and permits fluid discharge through pipe 126 to move the cutter to its first position (see full lines in Fig. 2). Next, the trip 135' engages with and operates the switch 135a, which in turn closes the circuit 138' for the coil of the solenoid 133 connected to the valve plunger of valve mechanism 121 which supplies fluid through pipe 122' to the cylinder 120 and permits fluid discharge through pipe 122 and effects movement of the jaw 104a to release the pipe A. Next, and finally, the advancing end of the slide 99 engages with and operates the switch 134a, which in turn closes the circuit 137' for the coil of the solenoid 133a connected to the valve plunger 132 of valve mechanism 117, which supplies the fluid through pipe 118' to the cylinder 116 and permits fluid discharge through pipe 118 and effects movement of the slide 99 rearwardly to its first or starting position; the trips 135', 136', being so mounted on the slide 99 that they ride the arms of their related switches in the rearward movement of the slide.

As shown, one contact of each switch is connected by a lead to one electric supply main 140 and the corresponding ends of the coils of the solenoids are connected by leads to the other electric supply main 140'.

The pump 129 is constructed to maintain a predetermined pressure in the fluid system and to automatically adjust itself to the varying conditions whereby the pressure will be substantially constant, this operation being advantageous since, from the foregoing description, it will be understood that after the fluid has been supplied to either end of each cylinder 120 and 123 and in some instances (dependent upon the length of the work sections) to either end of the cylinder 116, and moved the piston therein to the remote end of the cylinder the flow of fluid to and from that cylinder is arrested until the valve mechanism connected thereto is reversed. Such stoppage of fluid flow sets up a back pressure, the effect of which is to correspondingly reduce the output of the pump 129. The pump herein chosen for illustration comprises the following: 141 indicates a casing. 142 indicates a shaft suitably connected to the shaft of the motor 130. The shaft 142 is connected to a rotor 143 formed in its periphery with a plurality of substantially radially disposed slots 143a in which are slidably mounted vanes 144, normally pressed outwardly by the pressure of the fluid which is admitted to the slots 143a behind the vanes. The vanes 144 engage with the inner wall of a cylinder 145 and divide the space between the rotor 143 and cylinder into pumping compartments. At diametrically opposite sides the cylinder 145 is provided with blocks 146 the outer walls of which have sliding engagement with guide surfaces on blocks 147 suitably supported in the side walls of the casing 141. By preference, anti-friction elements, such as rollers supported at their ends in boxes may be provided between the surfaces of adjacent blocks. The cylinder 145 is supported on a coiled spring 148 which normally tends to move the cylinder 145 upwardly, the effect of which is to dispose the cylinder in eccentric relation to the rotor, and thereby increase the fluid output, with the rotor revolving at constant speed. The eccentric relation of the cylinder 145 to the rotor 143 is controlled by a plunger 149, having a head 150, which serves as a piston, mounted in a cylinder 151. A spring 152 engaging the head 150, normally tends to move the plunger downwardly in opposition to the spring 148, to decrease the eccentric relation between the cylinder 145 and rotor 143, whereas fluid at discharge pressure, admitted into the cylinder below the head 150, through ducts 153, tends to move the plunger upwardly, which permits the spring 148 to increase the eccentric relation. Accordingly, movement of the piston due to increase or decrease of the fluid pressure and position of the cylinder 145 is automatically controlled, the effect of which is to maintain the pressure in the system substantially constant.

By proper adjustment of the spring 152, which adjustment is provided for by a screw 154 mounted in the top wall of the cap 155 related to the cylinder 151 and enclosing the spring, the pressure to be maintained in the system may be raised or lowered. No claim is made herein to the construction of the pump 129 for which reason further illustration and description thereof is not necessary.

From the foregoing description it will be seen that the work is continuously moved forward, the advancing end thereof serving to effect movement of the slide and the latter to effect movement of the cutter to cut off a section of the work and permit the work to advance, whereby these operations are repeated. As the devices for operating the switches have a predetermined relation, the slide and cutter move a predetermined distance in each operation.

To those skilled in the art to which my invention relates, many changes in construction and widely differing embodiments and applications of the invention will suggest themselves without departing from the spirit and scope of the invention. My description and the disclosures herein are purely illustrative and are not intended to be in any sense limiting.

What I claim is:

1. In apparatus of the class described, the combination of a support, a slide reciprocatably mounted thereon, means for continuously supplying work relative to said slide, a fluid operated mechanism on said slide for clamping the work, a fluid operated mechanism, including a driven cutter, mounted on said slide for cutting the work into sections, a fluid operated mechanism for reciprocating said slide, valve means for controlling the supply of fluid to each said mechanism and the discharge of fluid therefrom, means including a device arranged in the path of movement of the work and a device carried by said slide for operating the valve means for said slide reciprocating mechanism, and separate means for operating the valve means for said clamping mechanism and said cutting mechanism, each of the last referred to means including a device carried by said slide.

2. In apparatus of the class described, the combination of a support, a slide reciprocatably mounted thereon, means for continuously supplying work relative to said slide, a fluid operated mechanism on said slide for clamping the work, a fluid operated mechanism, including a driven cutter, mounted on said slide for cutting the work into sections, a fluid operated mechanism for reciprocating said slide, valve means for controlling the supply of fluid to each said mechanism and the discharge of fluid therefrom, electrical means including a pair of switches for operating the valve element of each said valve means, a device movably mounted on said support arranged in the path of movement of the work and a device carried by said slide for operating the switches related to the valve means for said slide reciprocating mechanism, and devices on said slide for operating the respective pairs of switches related to the valve means for said clamping mechanism and said cutting mechanism.

3. In apparatus of the class described, the combination of a support, a slide reciprocatably mounted thereon, means for continuously supplying work relative to said slide, a fluid operated mechanism on said slide for clamping the work, a fluid operated mechanism, including a driven cutter, mounted on said slide for cutting the work into sections, a fluid operated mechanism for reciprocating said slide, a four-way valve means for controlling the supply of fluid to each said mechanism and the discharge of fluid therefrom, solenoids for operating the valve element of each said valve means, electrical circuits for said solenoids, including a switch for each circuit, devices, one arranged in the path of movement of the work and the other device carried by said slide for operating the switches to close the circuits for the solenoids related to the valve means for said slide reciprocating mechanism, and separate devices on said slide one arranged to operate the switches to close the circuits for the solenoids related to the valve means for said clamping mechanism and the other arranged to operate the switches to close the circuits for the solenoids related to the valve mechanism for said cutting mechanism.

4. In apparatus of the class described, the combination of a support, a slide reciprocatably mounted thereon, means for continuously supplying work relative to said slide, a fluid operated mechanism on said slide for clamping the work, a fluid operated mechanism, including a driven cutter, mounted on said slide for cutting the work into sections, a fluid operated mechanism for reciprocating said slide, valve means for controlling the supply of fluid to each said mechanism and the discharge of fluid therefrom, means including a device arranged in the path of movement of the work and a device carried by said slide for operating the valve means for said slide reciprocating mechanism, separate means for operating the valve means for said clamping mechanism and said cutting mechanism, each of the last referred to means including a device carried by said slide, and automatically operating means for supplying fluid to said mechanisms at a predetermined constant pressure.

5. In apparatus of the class described, the combination of a support, a slide reciprocatably mounted thereon, means for continuously supplying work relative to said slide, a fluid operated mechanism on said slide for clamping the work, a fluid operated mechanism, including a driven cutter, mounted on said slide for cutting the work into sections, a fluid operated mechanism for reciprocating said slide, a four-way valve means for controlling the supply of fluid to each said mechanism and the discharge of fluid therefrom, each said mechanism including a cylinder and a piston mounted therein and connections from each of said cylinders to the adjacent valve means, and each valve means including an element for alternately controlling the supply and discharge of the fluid through said connections with the adjacent cylinder, means including a device arranged in the path of movement of the work and a device carried by said slide for operating the element of the valve means for said slide reciprocating mechanism, separate means for operating the element of the valve means for said clamping mechanism and the element of the valve means for said cutting mechanism, each of the last referred to means including a device carried by said slide, and automatically operating means for supplying fluid to said mechanisms at a predetermined constant pressure.

6. In apparatus of the class described, the combination of a support, a slide reciprocatably mounted thereon, means for continuously supplying work relative to said slide, a fluid operated mechanism, including a driven cutter, mounted on said slide for cutting the work into sections, a fluid operated mechanism for reciprocating said slide, a valve means for controlling the supply of fluid to each said mechanism and the discharge of fluid therefrom, means including a device arranged in the path of movement of the work and a device carried by said slide for operating the valve means for said slide reciprocating mechanism, means for operating the valve means for said cutting mechanism, the last referred to means including a device carried by said slide, and automatically operating means for supplying fluid to said mechanisms at a predetermined constant pressure.

7. In apparatus of the class described, the combination of a support, a slide reciprocatably mounted thereon, means for continuously supplying work relative to said slide, a driven cutter movably mounted on said slide for cutting the work into sections, a double acting cylinder on said slide for moving the cutter into and out of cutting relation to the work, a double acting cylinder for reciprocating said slide, four-way valves each having fluid connections with the opposite ends of one of said cylinders, means including a device arranged in the path of movement of the work and a device carried by said slide for operating the element of the valve for said slide reciprocating cylinder, means for operating the element of the valve for said other cylinder, the last referred to means including a device carried by said slide, and automatically operating means for supplying fluid to said cylinders at a predetermined constant pressure.

8. In apparatus of the class described, the combination of a support, a slide reciprocatably mounted on said support, means for continuously supplying work relative to said slide, a fluid operated mechanism for operating said slide, a fluid operated mechanism mounted on said slide for cutting the work into sections, means arranged to be actuated by the work for controlling said slide operating mechanism, means actuated by the movement of the slide for controlling the movement of said cutting mechanism, and a fluid system for supplying fluid at a constant pressure to said mechanisms.

9. In apparatus of the class described, the combination of a support, a slide reciprocatably mounted on said support, means for continuously supplying work relative to said slide, a driven cutter reciprocatably supported on said slide, separate mechanisms for reciprocating said slide and said cutter, each said mechanism comprising a cylinder and a valve having an inlet and an outlet, a fluid connection to each end of the adjacent cylinder and a valve element for alternately controlling the supply of fluid to and its discharge from each end of said adjacent cylinder, means, including a device disposed in the path of movement of the work, for operating the valve element which controls the supply of fluid to the cylinder for reciprocating said reciprocating slide, co-acting devices between said support and slide for operating said valve element which controls the supply of fluid to the cylinder for reciprocating said cutter, and means automatically operating to supply fluid to the inlets of said valves at a predetermined constant pressure.

10. In apparatus of the class described, the combination of a support, a slide reciprocatably mounted on said support, means for continuously supplying work relative to said slide, a support reciprocatably mounted on said slide, a motor and a cutter driven thereby mounted on the last mentioned support, separate mechanisms for reciprocating said slide and said last mentioned support, each said mechanism comprising a cylinder and a valve having an inlet and an outlet, a liquid connection to each end of the adjacent cylinder and a valve element for alternately controlling the supply of fluid to and its discharge from each end of said adjacent cylinder, means on said first mentioned support arranged to be actuated by the work for controlling the operation of said valve element related to the mechanism for operating said slide, co-acting means on said first mentioned support and slide for controlling the operation of the valve element related to the other mechanism, and means automatically operating to supply fluid to the inlets of said valves at a predetermined constant pressure.

11. A machine of the class described, adapted for operating on a traveling workpiece, comprising: a slidably mounted slide plate; hydraulic means for reciprocating said slide plate; a work tool for operating on said workpiece; a holder for said tool movable toward and away from said workpiece; a supporting member movable in unison with said slide plate for supporting said tool holder; hydraulic means for moving said tool holder toward and away from said workpiece; control means for controlling the operation of said last-named hydraulic means and effecting a movement of said tool holder toward said workpiece upon the sliding of said plate in one direction during the sliding movement of said plate in said direction a predetermined distance; means for controlling said first-named hydraulic means for effecting a slidable movement of said slide plate in said direction; means for controlling said second-named hydraulic means for effecting a movement of said tool holder away from said workpiece upon movement of said slide plate in said direction, said predetermined distance; and control means for effecting the operation of said first-named hydraulic means for moving said slide plate in the opposite direction, upon the movement of said tool holder away from said workpiece a predetermined distance.

12. A machine of the class described, adapted for operating on a traveling workpiece, comprising: a slidably mounted slide plate; hydraulic means for reciprocating said slide plate; a work tool for operating on said workpiece; a holder for said tool movable toward and away from said workpiece; a supporting member movable in unison with said slide plate for supporting said tool holder; hydraulic means for moving said tool holder toward and away from said workpiece; control means for controlling the operation of said last-named hydraulic means and effecting a movement of said tool holder toward said workpiece upon the sliding of said plate in one direction during the sliding movement of said plate in said direction a predetermined distance; means for controlling said first-named hydraulic means for effecting a slidable movement of said slide plate in said direction; means for controlling said second-named hydraulic means for effecting a movement of said tool holder away from said workpiece upon movement of said slide plate in said direction, said predetermined distance; control means for effecting the operation of said first-named hydraulic means for moving said slide plate in the opposite direction, upon the movement of said tool holder away from said workpiece a predetermined distance; and means for regulating the speed of operation of each of said hydraulic means.

13. A machine of the class described, adapted for operating upon a traveling workpiece fed therethrough, comprising: a slidably mounted slide plate; hydraulic means for reciprocating said slide plate; a work tool for operating on said workpiece; a tool holder for said work tool; hydraulic means for moving said tool holder toward and away from said workpiece; control means engageable with said workpiece and adapted, upon engagement therewith, for effecting the operation of each of said hydraulic means for sliding said slide plate in one direction and moving said tool holder toward said workpiece for operating thereon; a control means operable, upon the sliding of said slide plate a predetermined distance, for effecting the operation of said second-named hydraulic means for moving said tool holder away from said workpiece; and means operable, upon the movement of said tool holder away from said workpiece a predetermined distance, for operating said first-named hydraulic means for moving said slide plate in the opposite direction.

14. A machine of the class described, adapted for operating upon a traveling workpiece fed therethrough, comprising: a slidably mounted slide plate; hydraulic means for reciprocating said slide plate; a work tool for operating on said workpiece; a tool holder for said work tool; hydraulic means for moving said tool holder toward and away from said workpiece; control means engageable with said workpiece and adapted, upon engagement therewith, for effecting the operation of each of said hydraulic means for sliding said slide plate in one direction and moving said tool holder toward said workpiece for operating thereon; a control means operable, upon the sliding of said slide plate a predetermined distance, for effecting the operation of said second-named hydraulic means for moving said tool holder away from said workpiece; means operable, upon the movement of said tool holder away from said workpiece a predetermined distance, for operating said first-named hydraulic means for moving said slide plate in the opposite direction; and a supporting member movable in unison with said slide plate for supporting said second-named hydraulic means and said tool holder.

15. A machine of the class described, adapted for operating on a traveling workpiece fed therethrough, comprising: a slidably mounted slide plate; hydraulic means for reciprocating said slide plate; a tool holder; a tool mounted on said tool holder and movable toward and away from the workpiece; hydraulic means for reciprocating said tool holder; means for mounting said second-named hydraulic means on said slide plate for movement in unison therewith; a control mechanism engageable with the traveling workpiece and adapted upon engagement therewith for operating said first-named hydraulic means for sliding said slide plate in one direction and said second-named hydraulic means for moving the work tool toward the workpiece; means operable, upon the sliding of said slide plate a predetermined distance, for controlling the operation of said second-named hydraulic means for effecting a movement of said work tool away from said workpiece; and control means operable upon the movement of said work tool away from said workpiece a predetermined distance for effecting an operation of said first-named hydraulic means for moving said slide plate in the opposite direction.

16. A machine of the class described, adapted for operating on a traveling workpiece fed therethrough, comprising: a slidably mounted slide plate; hydraulic means for reciprocating said slide plate; a tool holder; a tool mounted on said tool holder and movable toward and away from the workpiece; hydraulic means for reciprocating said tool holder; means for mounting said second-named hydraulic means on said slide plate for movement in unison therewith; a control mechanism engageable with the traveling workpiece and adapted upon engagement therewith for operating said first-named hydraulic means for sliding said slide plate in one direction and said second-named hydraulic means for moving the work tool toward the workpiece; means operable, upon the sliding of said slide plate a predetermined distance, for controlling the operation of said second-named hydraulic means for effecting a movement of said work tool away from said workpiece; control means operable upon the movement of said work tool away from said workpiece a predetermined distance for effecting an operation of said first-named hydraulic means for moving said slide plate in the opposite direction; and manually operable means for regulating the speed of operation of each of said hydraulic means.

HOWARD I. MORRIS.